(12) United States Patent
Spillner

(10) Patent No.: US 6,557,366 B1
(45) Date of Patent: May 6, 2003

(54) APPARATUS FOR COLD-HOLDING FOOD PRODUCTS

(75) Inventor: Wayne K. Spillner, Westerville, OH (US)

(73) Assignee: Donatos Pizzeria Corporation, Columbus, OH (US)

( * ) Notice: Subject to any disclaimer, the term of this patent is extended or adjusted under 35 U.S.C. 154(b) by 0 days.

(21) Appl. No.: 10/025,108

(22) Filed: Dec. 19, 2001

Related U.S. Application Data

(63) Continuation of application No. 09/929,882, filed on Aug. 14, 2001.

(51) Int. Cl.[7] .............................................. F25D 21/14
(52) U.S. Cl. .......................... 62/285; 62/258; 62/254; 62/350; 62/332
(58) Field of Search .................... 62/285, 258, 254, 62/330, 332

(56) References Cited

U.S. PATENT DOCUMENTS

| | | | |
|---|---|---|---|
| 3,695,056 A | * | 10/1972 | Glynn et al. .................. 62/168 |
| 4,023,476 A | | 5/1977 | Burgess |
| 4,135,369 A | * | 1/1979 | Allgeyer et al. .............. 62/251 |
| 4,331,690 A | * | 5/1982 | Bradshaw ................... 426/233 |
| 4,635,540 A | | 1/1987 | Dowds |
| 4,674,402 A | | 6/1987 | Raufeisen |
| 4,791,861 A | | 12/1988 | Weinkle et al. |
| 4,792,456 A | | 12/1988 | Katz et al. |
| 4,802,340 A | * | 2/1989 | Johnson ....................... 62/229 |
| 5,072,666 A | | 12/1991 | Hullstrung |
| 5,381,670 A | * | 1/1995 | Tippmann et al. ............ 62/330 |
| 5,519,946 A | | 5/1996 | Renzi |
| 5,580,591 A | | 12/1996 | Cooley et al. |
| 5,598,886 A | * | 2/1997 | Criado-Mellado .......... 165/254 |
| 6,240,739 B1 | * | 6/2001 | Hayes .......................... 62/255 |
| 6,266,963 B1 | * | 7/2001 | Rudick ............................. 62/6 |
| 6,298,673 B1 | * | 10/2001 | Fung et al. ..................... 62/82 |
| 6,350,002 B1 | * | 2/2002 | Takaoka et al. ............ 312/407 |
| 6,360,548 B1 | * | 3/2002 | Navarro ......................... 62/93 |

FOREIGN PATENT DOCUMENTS

EP    0848221 A1    6/1998

* cited by examiner

Primary Examiner—William C. Doerrler
Assistant Examiner—Mark Shulman
(74) Attorney, Agent, or Firm—Robert E. Browne; Michael G. Kelber; Gary R. Jarosik

(57) ABSTRACT

An apparatus for cold-holding food product. The apparatus comprises a cabinet carrying a refrigeration unit including a plurality of refrigerated shelves. The plurality of refrigerated shelves are adapted to frost on both sides under the control of the refrigeration unit to thereby maintain the quality of food product held on the shelves. To allow for the drainage of any melting frost, the plurality of shelves may be angled and a drain pan system included to direct the water away from the shelves to a drain or condensate evaporator during defrost periods. To prevent the removal of frost with the unloading of food products from the shelves, wire racks or trivets may be used to elevate the food product on baking pans above the frosted shelve surfaces.

22 Claims, 6 Drawing Sheets

APPARATUS FOR COLD-HOLDING FOOD PRODUCTS

RELATED APPLICATION

This application is a continuation of and related to U.S. application Ser. No. 09/929,882 entitled "Apparatus and Method For Cold-Proofing Multiple Dough Pieces" filed on Aug. 14, 2001 and incorporated herein by reference in its entirety.

BACKGROUND OF THE INVENTION

This invention generally relates to the field of food product preparation and, more particularly, to an apparatus for cold-holding food products.

In the restaurant industry it is known to pre-prepare food products to a near-completed stage in anticipation of times of peak customer demand. In this manner, when the time of peak customer demand arises, minimal time is need to complete the preparation of the food product so as to timely deliver the finished food product to the customer. For example, in the pizza industry, it is known to pre-prepare the pizza food product by cold-storing dough pieces that are sauced or sauced and pre-topped at a time before anticipated times of peak customer demand. Thus, when the food product is needed to meet customer demand, the pre-prepared pizza food product need only be finished (if necessary) and cooked before being delivered to the customer.

While this method of pre-preparing food product is effective in minimizing customer wait times for finished food products, currently known systems and methods for cold-holding pre-prepared food products have the disadvantage of only providing a limited time period during which the pre-prepared food product can be held. Cold-holding the food product beyond this time period will negatively effect the overall quality of the food product. In the case of cold-holding pre-prepared pizza food product, currently known systems only provide for a cold-holding time period of approximately 20 minutes before cold-proofed pizza dough starts to expand beyond the pan. When this occurs, baking the pizza in an oven causes the dough to brown disproportionately resulting in a damaged, finished food product which is not suitable for delivery to the customer.

Accordingly, a need exists for an improved system for cold-holding pre-prepared food products which extends the time during which the pre-prepared food products can be held while allowing the pre-prepared food products to maintain their quality.

SUMMARY OF THE INVENTION

In accordance with this need, the present invention is realized in an apparatus for cold-holding food product which includes a cabinet in which is carried a refrigeration unit and a plurality of refrigerated shelves. The plurality of refrigerated shelves are adapted to frost under the control of the refrigeration unit to thereby maintain the quality of food product held on the shelves. To allow for the drainage of any melting frost, the plurality of shelves may be angled. To prevent the removal of frost with the unloading of food products from the shelves, wire racks may be used to elevate the food product above the frosted shelve surfaces.

The following detailed description and drawings will aid in better appreciation of the objects, advantages, features, properties, and relationships of the present invention. The description and drawings set forth an illustrative aspect of the invention and demonstrate the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION OF THE INVENTION

Figure 1:
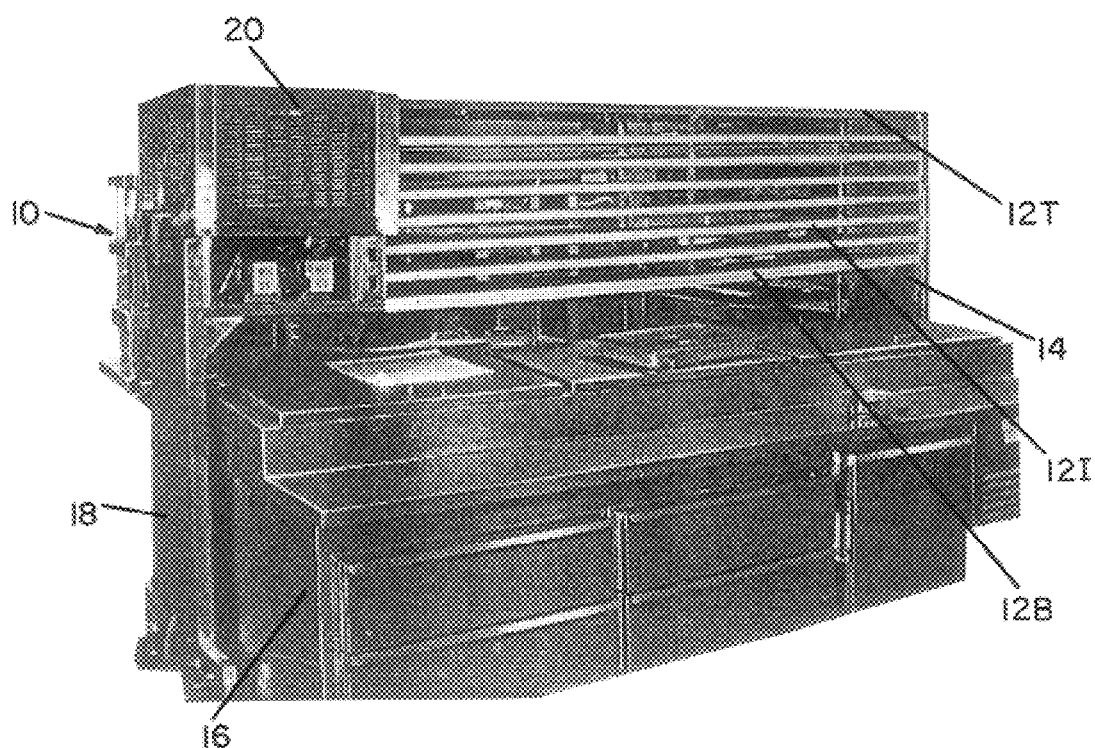
FIG. 1 illustrates a perspective view of an exemplary apparatus for cold-holding food product constructed in accordance with the present invention.

Turning now to the figures wherein like reference numerals refer to like elements, there is illustrated an apparatus 10 for use in cold-holding food product. As will be appreciated from the description that follows, the cold-holding apparatus 10 allows pre-prepared food product to be held for an extended period of time to thereby meet speed of service goals while also maintaining product quality. More specifically, the subject cold-holding apparatus 10 provides a means for maintaining pre-prepared pizza food product for time periods extending up to 3½ hours while minimizing yeast activity within the dough which may result in expansion of the dough beyond the pizza pan and bubbles in the pizza crust.

Figure 2:
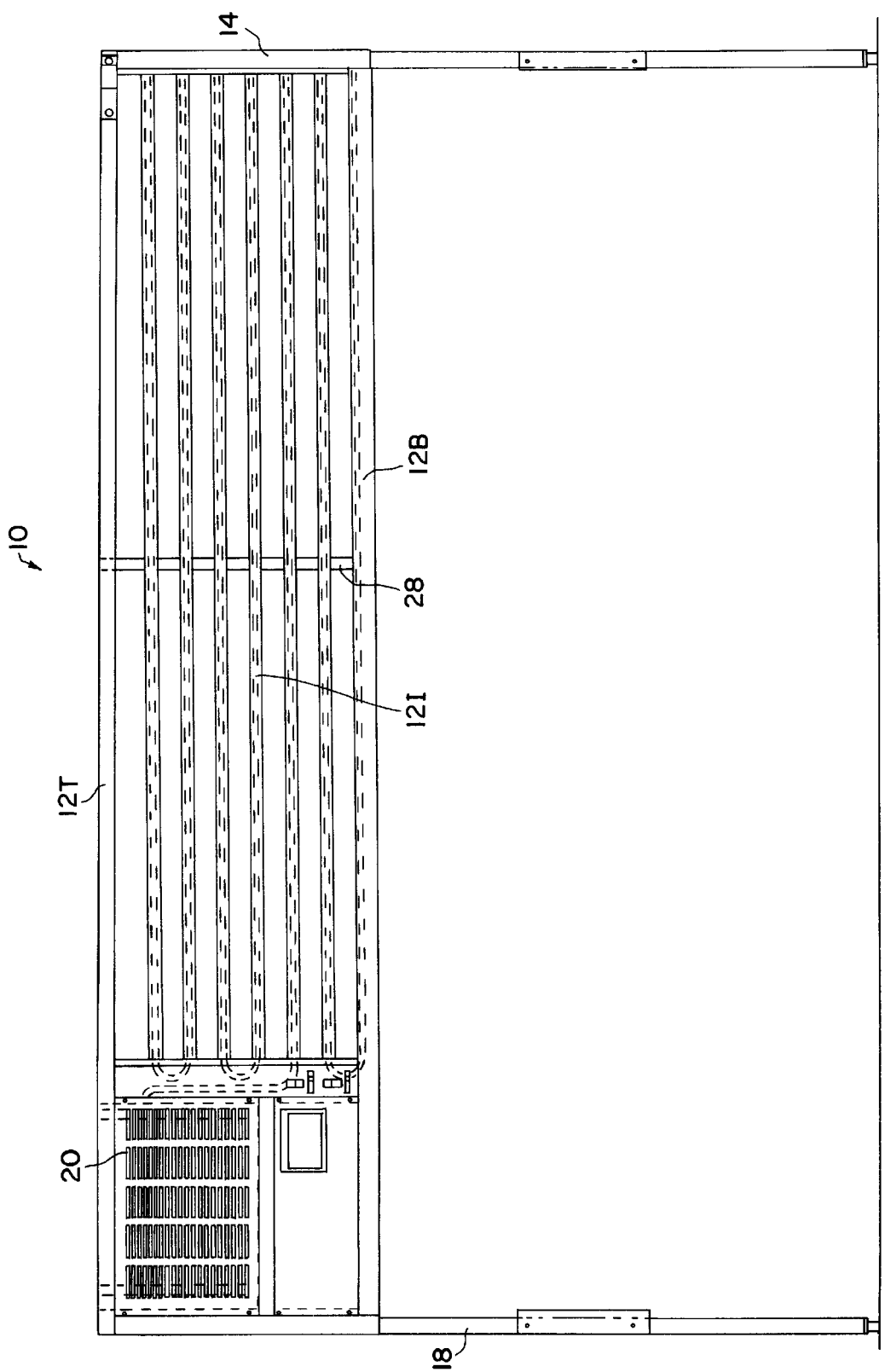
FIG. 2 illustrates a front schematic view of the cold-holding apparatus of FIG. 1.
Figure 3:
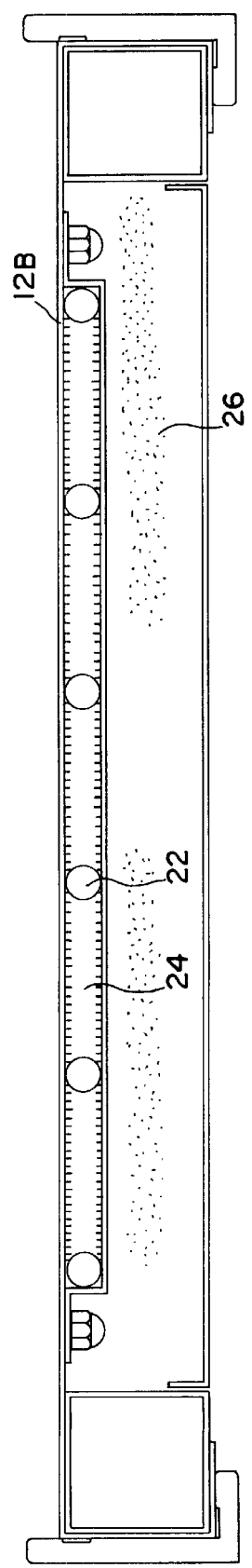
FIG. 3 illustrates a cross-sectional schematic view of an exemplary bottom shelf of the cold-holding apparatus of FIG. 1.
Figure 4:
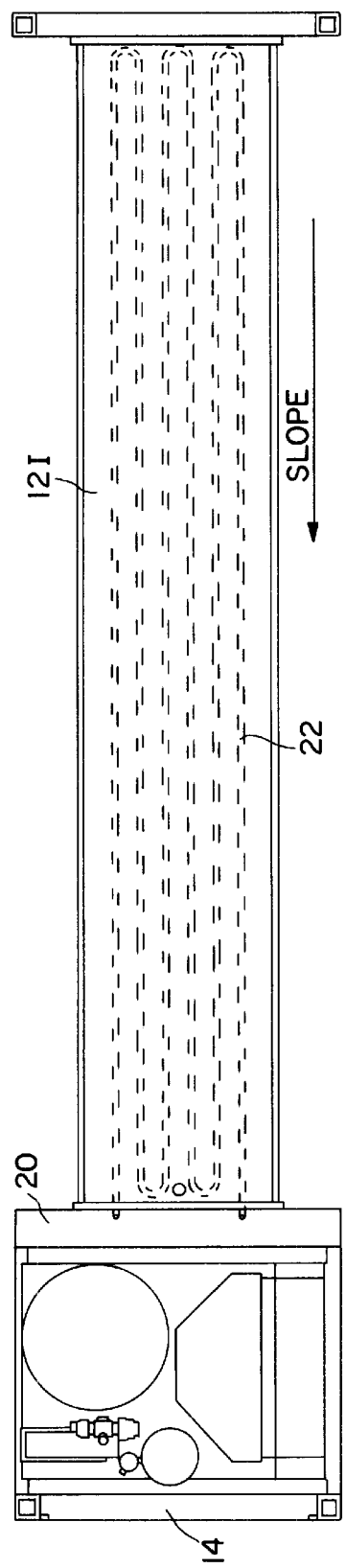
FIG. 4 illustrates a top-plan schematic view of an exemplary intermediate shelf of the cold-holding apparatus of FIG. 1.
Figure 5:
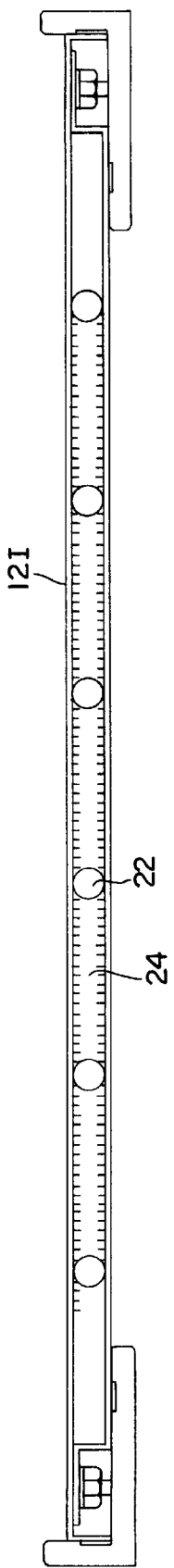
FIG. 5 illustrates a cross-sectional schematic view of an exemplary intermediate shelf of the cold-holding apparatus of FIG. 1

For use in cold-holding pre-prepared food product, the cold-holding apparatus 10 includes a plurality of metallic shelves 12 mounted within a cabinet 14. As seen in FIGS. 1 and 2, it is preferred that the cabinet 14 have opposing open sides and opposing closed sides. One open side allows access to the shelves 12 such that pre-prepared food product can be loaded onto the shelves 12 while the other open side allows access to the shelves 12 such that pre-prepared food product can be unloaded from the shelves. Accordingly, the cabinet 12 is especially useful in conjunction with a make table 16. As will be appreciated by one of skill in the art, the make table 16 provides two opposing work spaces for use in the preparation of the food product. For example, one side of the make table 16 can be used by employees to sauce and cheese pizza dough and the other side of the make table 16 can be used by employees to place toppings on the sauced and cheesed pizza dough. Preferably, the cold-holding apparatus 10 is positioned intermediate the opposing sides of the make table 16 whereby employees can load and unload the pre-prepared food product on and off of the shelves 12 in the course of performing preparation operations on their respective sides of the make table 16.

To allow the cold-holding apparatus 10 to be used in connection with the make table 16, the cold-holding apparatus 10 can be provided with legs 18 that allow the shelves 12 to be placed in an elevated position relative to the middle of the make table 16. While not required, the width of the cold-holding apparatus 10 can be dimensioned such that the cold-holding apparatus 10 straddles the width of the make table 16 and the legs 18 are positioned at the ends of the cold-holding apparatus 10 such that they support the cold-holding apparatus 10 directly on the floor. Furthermore, the legs may include wheels or other means for allowing the cold-holding apparatus to be easily moved from location to location. It is also contemplated that the cold-holding apparatus 10 could be mounted directly to or be integral with the make table 16. When the cold-holding apparatus 10 is arranged such that the legs 18 are used to support the cold-holding apparatus 10 on the floor, it is preferred that the legs be removable to allow for ease in shipment.

For use in maintaining the temperature within the cold-holding apparatus 10, a refrigeration unit 20 is also mounted within the cabinet 14. Preferably, the refrigeration unit 20 is positioned within the cabinet 14 such that it is adjacent to one end of the shelves 12. To refrigerate the shelves 12 and, accordingly, the cold-holding apparatus 10, each of the shelves 12 includes piping 22, preferably in the form of copper coils, that carries a refrigerant. As will be appreciated, the refrigerant is circulated within the piping 22 by the refrigeration unit 20. The piping 22 may be also be encased within the shelves 12 using a thermally conductive mastic 24 for the purpose of providing a more even distribution of the temperature. For carrying the piping 22 and mastic 24, the shelves 12 may have a double pan or sandwich-like construction.

To refrigerate the shelves 12 to thereby open-air refrigerate the cold-holding apparatus the circulating refrigerant is desired to maintain the shelves 12 at a temperature of approximately 20 degrees Fahrenheit. In this manner, the circulating refrigerant functions to frost the top and the bottom of the intermediate shelves 121 in a very thin barrier of ice. Meanwhile, the bottom shelf 12B may be provided with an insulating barrier 26 which is disposed underneath the double pan construction which allows the top of the bottom shelf 12B to frost while insulating the bottom of the cold-holding apparatus 10. Similarly, the top shelf 12T may be provided with an insulating barrier which is disposed over the top of the double pan construction which allows the bottom of the top shelf 12B to frost while insulating the top of cold-holding apparatus 10.

For maintaining the temperature of the cold-holding apparatus 10, it is preferred that air currents in the kitchen should be directed so as to not blow directly on the cold-holding apparatus 10. Furthermore, placing the cold-holding apparatus 10 in an air-conditioned and dehumidified room is preferred or else too much ice might develop during the course of usage. When too much ice develops, condensation rain may occur which will negatively effect the quality of any food product being held. Temperature regulation should be accomplished by using a thermostat which measures the temperature of the shelves 12 and controls the operation of the refrigeration unit 20.

To prevent the dragging of frost onto a food preparation surface of the make area 16 when food product is unloaded from the cold-holding apparatus 10, it is preferred that a trivet or wire tray/shelf be added to the top of each shelf 12 to keep the food product held on a shelf elevated above the frosted shelf surface. In this regard, the food product is typically in a baking pan which, in turn, is held on the wire tray or trivet. Furthermore, since it is desirable to defrost, clean, sanitize, and dry the cold-holding apparatus 10 on a daily basis, it is preferred that the shelves be angled to facilitate the drainage of any liquids such as, melted ice. To this end, the shelves 12 can be provided with a one inch slope with the ends of the shelves adjacent to the refrigeration unit 20 be mounted at a lower height relative to the opposite ends of the shelves which are adjacent to the end of the cabinet 16. A drain pan system may also be included to direct the water away from the shelves to a drain or condensate evaporator during defrost periods.

To support the shelves 12 against sagging under the weight of food product, rigid side support bars 28 can be attached between the shelves 12. When used to hold pre-prepared pizza food product, the shelves should be provided with a depth sufficient to maintain a pizza pan within the cold-holding apparatus environment. It has been found that providing the shelves with a 16 inch depth is sufficient for this purpose. Additionally, when used to hold pre-prepared pizza food product, spacing between the shelves 12 can be minimized to approximately 3–5 inches. It will be appreciated that minimizing the empty space between the food product and the bottom of an adjacent shelf helps maintain the food product at the desired temperature while also maximizing the number of shelves 12 and, accordingly food product, that can be carried within the cold-holding apparatus 10.

Figure 7:
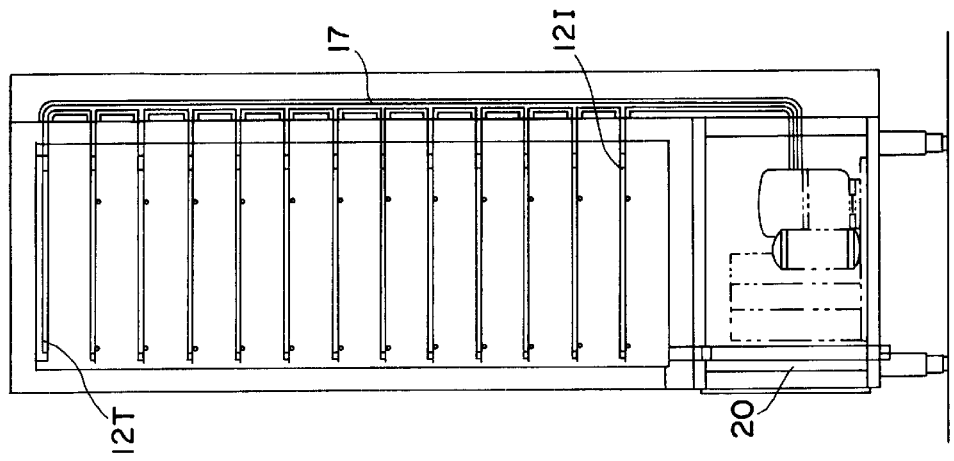
FIG. 7 illustrates a side schematic view of the cold-holding apparatus of FIG. 6.
Figure 6:
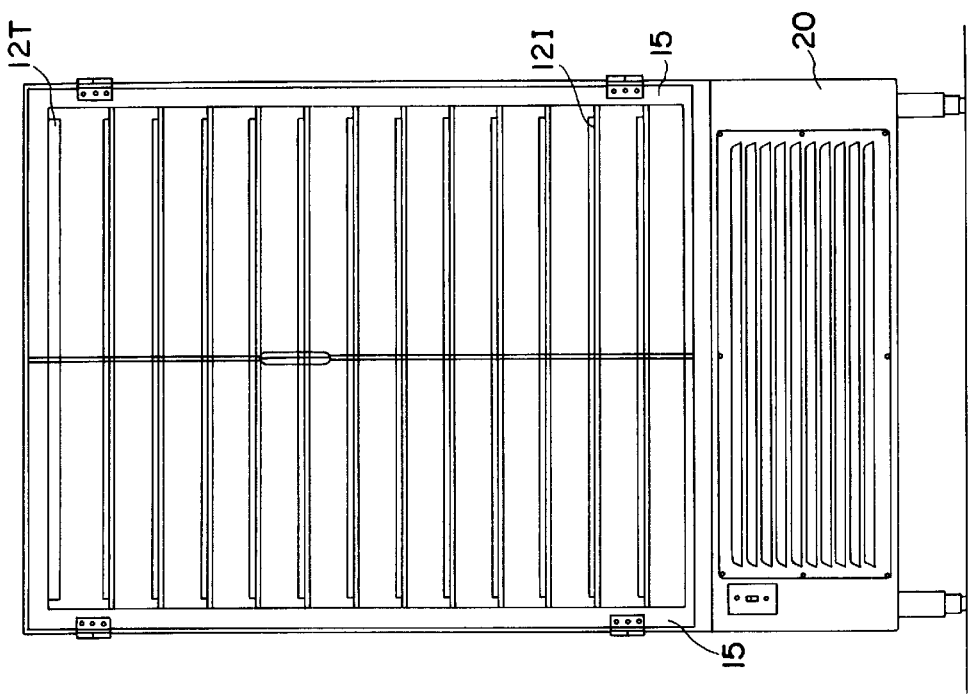
FIG. 6 illustrates a front schematic view of a further exemplary embodiment of the cold-holding apparatus.

In a further embodiment, illustrated in FIGS. 6 and 7, the cold-holding apparatus 10 is in the form of a cabinet having a plurality of angled, refrigerated shelves 12 that are arranged above the refrigeration unit 20. In this illustrated embodiment, the cold-holding apparatus 10 has hinged 15 that can be closed to generally enclose the front of the cabinet. Furthermore, the cabinet includes a back 17 thereby providing the case with three enclosed sides. Within the back 17 may be included the pipes which are used to circulate the refrigerant between the shelves 12 and the refrigeration unit 20.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. An apparatus for cold-holding food product, comprising:
    a cabinet; and
    a refrigeration unit including a plurality of refrigerated shelves for holding the food product mounted within the cabinet wherein the plurality of refrigerated shelves are adapted to frost under the control of the refrigeration unit and wherein the plurality of shelves are angled to allow for the drainage of any melting frost.

2. The apparatus as recited in claim 1, wherein the cabinet has first and second opposed open sides allowing access to the plurality of refrigerated shelves from opposite sides of the cabinet.

3. The apparatus as recited in claim 2, wherein the plurality of refrigerated shelves each comprise tubing through which a refrigerating agent from the refrigerating unit flows.

4. The apparatus as recited in claim 3, wherein the plurality of refrigerated shelves each comprise a temperature conductive mastic encasing the tubing.

5. The apparatus as recited in claim 4, wherein the plurality of refrigerated shelves each comprise a metallic pan in which the piping and mastic are carried.

6. The apparatus as recited in claim 5, wherein the plurality of refrigerated shelves are maintained at a temperature of approximately 20 degrees Fahrenheit.

7. The apparatus as recited in claim 5, wherein a bottom one of the plurality of refrigerated shelves comprises an insulating layer disposed underneath the metallic pan.

8. The apparatus as recited in claim 5, wherein a top one of the plurality of refrigerated shelves comprises an insulating layer disposed on top of the metallic pan.

9. The apparatus as recited in claim 5, wherein the cabinet comprises a pair of legs for elevating the apparatus over a make table.

10. The apparatus as recited in claim 9, wherein the pair of legs comprise two separable leg components.

11. An apparatus for cold-holding food product, comprising:
   a cabinet;
   a refrigeration unit including a plurality of intermediate refrigerated shelves, a top refrigerated shelf, and a bottom refrigerated shelf all mounted within the cabinet wherein each of refrigerated shelves is adapted to frost under the control of the refrigeration unit; and
   a plurality of wire shelves carried on a top side of the bottom refrigerated shelf and the top sides of the plurality of intermediate shelves on which the food product is to be held within the apparatus.

12. The apparatus as recited in claim 11, wherein the plurality of intermediate shelves and the bottom shelf are angled to allow for the drainage of any melting frost.

13. The apparatus as recited in claim 11, wherein the cabinet has first and second opposed open sides allowing access to the plurality of refrigerated shelves from opposite sides of the cabinet.

14. The apparatus as recited in claim 13, wherein the plurality of refrigerated shelves each comprise tubing through which a refrigerating agent from the refrigerating unit flows.

15. The apparatus as recited in claim 14, wherein the plurality of refrigerated shelves each comprise a temperature conductive mastic encasing the tubing.

16. The apparatus as recited in claim 15, wherein the plurality of refrigerated shelves each comprise a metallic pan in which the piping and mastic are carried.

17. The apparatus as recited in claim 16, wherein the plurality of refrigerated shelves are maintained at a temperature of approximately 20 degrees Fahrenheit.

18. The apparatus as recited in claim 16, wherein the bottom refrigerated shelf comprises an insulating layer disposed underneath the metallic pan.

19. The apparatus as recited in claim 16, wherein the top refrigerated shelf comprises an insulating layer disposed on top of the metallic pan.

20. The apparatus as recited in claim 16, wherein the cabinet comprises a pair of legs for elevating the apparatus over a make table.

21. The apparatus as recited in claim 20, wherein the pair of legs comprise two separable leg components.

22. The apparatus as recited in claim 16, wherein the refrigerated shelves are sized and arranged to carry pre-prepared pizza food product.

* * * * *